(No Model.)

J. H. BAYNES.
CLIP FOR SUPPORTING UMBRELLAS, STICKS, &c.

No. 562,566. Patented June 23, 1896.

Witnesses
H. van Oldenneel
E. A. Scott

Inventor
John Henry Baynes
by Richards
Attorneys

UNITED STATES PATENT OFFICE.

JOHN HENRY BAYNES, OF MANCHESTER, ENGLAND.

CLIP FOR SUPPORTING UMBRELLAS, STICKS, &c.

SPECIFICATION forming part of Letters Patent No. 562,566, dated June 23, 1896.

Application filed October 25, 1895. Serial No. 566,912. (No model.) Patented in England January 22, 1895, No. 1,443.

*To all whom it may concern:*

Be it known that I, JOHN HENRY BAYNES, a subject of the Queen of Great Britain, and a resident of Market Street, Manchester, in the county of Lancaster, England, have invented a certain new and useful Improved Clip for Supporting Umbrellas, Sticks, and the Like, (for which I have obtained Letters Patent in Great Britain, numbered 1,443, dated January 22, 1895,) of which the following is a specification.

My invention relates to clips for supporting umbrellas, walking-sticks, golf-clubs, rackets, pipes, and the like in shop-windows and other places for exhibition, and the object of my improvements is to make a clip which is reliable and which will not scratch or otherwise injure the article which is suspended from it.

I make my improved clip of a piece of flexible material cut or molded to the required shape, in which two holes are made and to which a hook is secured.

Figure 1:
Figure 2:
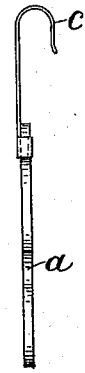
Figure 3:
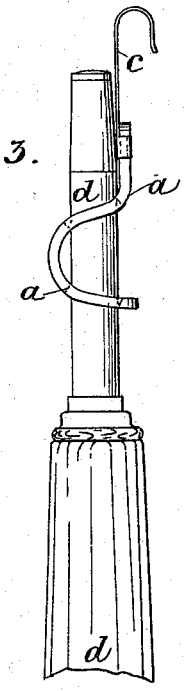

In the accompanying sheet of drawings, Figures 1 and 2 are front and side views, respectively, of a clip made according to my invention. Fig. 3 is a side view of the clip with an umbrella suspended therefrom.

In the drawings, $a$ represents the body of the clip, which is formed of rubber or canvas and rubber sheeting or any suitable elastic or flexible fabric or material, such as leather, and is made with two holes $b\ b$, the edges of which are rectangular. To the body of each clip is secured a metal or other hook $c$ for the purpose of supporting the clip.

The end of an umbrella $d$ or other similar article is passed through the two holes $b$, the sharp edges of which bear against the stick and hold it firmly, as shown in Fig. 3.

These improved clips can be applied more easily than metal clips. They will not scratch the sticks, nor allow them to slip, nor are they liable to be injured by repeated bending.

Having now particularly described and ascertained the nature of my said invention and in what manner the same is to be performed, I declare that what I claim, and desire to secure by Letters Patent of the United States, is—

A holder for non-flexible articles such as canes and umbrellas and the like comprising a strip of flexible material adapted to assume concavo-convex form and having openings axially in line with each other when the strap is of said form, substantially as described.

In witness whereof I have hereunto set my hand in presence of two witnesses.

JOHN HENRY BAYNES.

Witnesses:
   S. W. GILLETT,
   HERBERT R. ABBEY.